(12) United States Patent
Li

(10) Patent No.: US 7,034,574 B1
(45) Date of Patent: Apr. 25, 2006

(54) LOW-VOLTAGE DIFFERENTIAL SIGNAL (LVDS) TRANSMITTER WITH HIGH SIGNAL INTEGRITY

(75) Inventor: Zhongmin Li, Pocatello, ID (US)

(73) Assignee: AMI Semiconductor, Inc., Pocatello, ID (US)

( * ) Notice: Subject to any disclaimer, the term of this patent is extended or adjusted under 35 U.S.C. 154(b) by 64 days.

(21) Appl. No.: 10/920,009

(22) Filed: Aug. 17, 2004

(51) Int. Cl.
 *H03K 19/0175* (2006.01)
(52) U.S. Cl. .......................................... 326/83; 326/86
(58) Field of Classification Search ................. 326/82, 326/83, 86, 89
 See application file for complete search history.

(56) References Cited

U.S. PATENT DOCUMENTS

| | | | |
|---|---|---|---|
| 5,465,058 A | 11/1995 | Krenik et al. .................. | 326/83 |
| 6,313,662 B1 | 11/2001 | Ide .............................. | 326/83 |
| 6,380,797 B1 | 4/2002 | Macaluso et al. ........... | 327/513 |
| 6,407,582 B1 | 6/2002 | Chan ............................ | 326/86 |
| 6,433,579 B1 | 8/2002 | Wang et al. .................. | 326/38 |
| 6,617,881 B1 * | 9/2003 | Uchiki et al. ................. | 326/86 |
| 6,686,772 B1 * | 2/2004 | Li et al. ........................ | 326/83 |
| 6,804,305 B1 * | 10/2004 | Chan ............................ | 375/257 |

\* cited by examiner

*Primary Examiner*—Don P. Le
(74) *Attorney, Agent, or Firm*—Workman Nydegger

(57) ABSTRACT

A differential signal output driver circuit having four switching transistors and having a bias transistor that shields each of the switching transistors from the corresponding output terminal thereby blocking the Miller capacitance of the switching capacitor from generating overshoot or undershoot in the output differential voltage. Also, the output driver circuit may be driven by a differential skew cancellation circuit that generates a balanced differential signal to drive the switching transistors to further improve signal integrity. The signal path for generating each signal in the differential signal goes through a similar structure thereby ensuring similar slew in each differential signal provided to the output driver circuit.

13 Claims, 6 Drawing Sheets

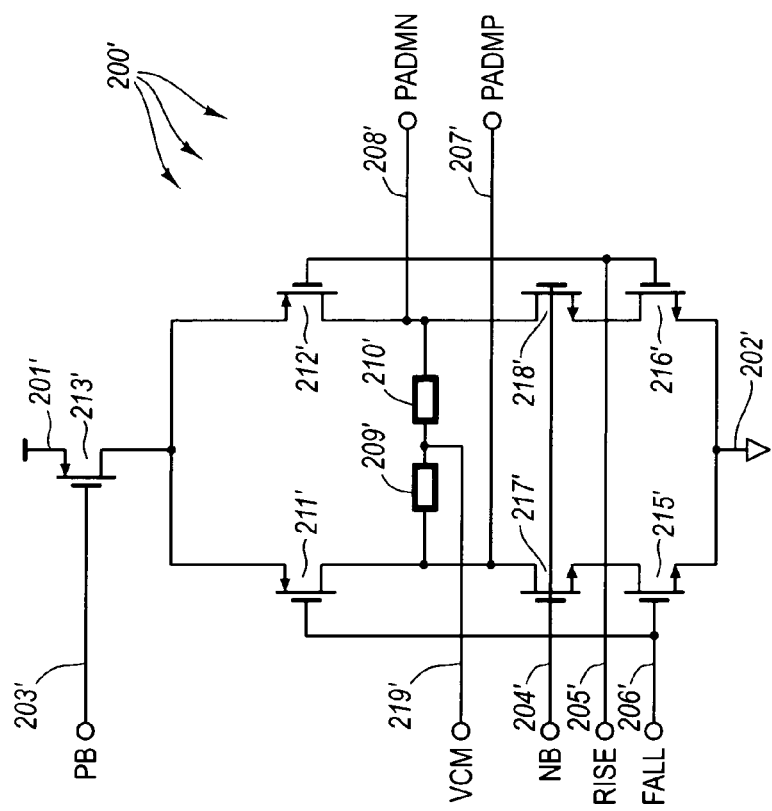
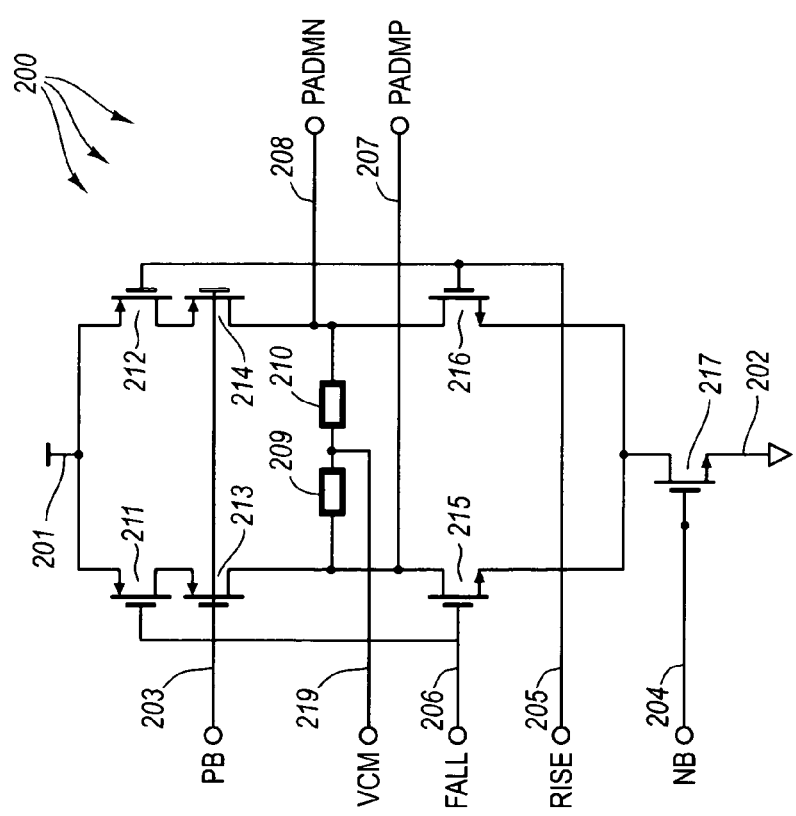
Fig. 2A
Fig. 2B

LOW-VOLTAGE DIFFERENTIAL SIGNAL (LVDS) TRANSMITTER WITH HIGH SIGNAL INTEGRITY

BACKGROUND OF THE INVENTION

1. The Field of the Invention

The present invention relates generally to analog circuits. More specifically, the present invention relates to low-voltage differential signal transmitters that have high signal integrity.

2. Background and Relevant Art

Electronic circuitry provides complex functionality that is proving ever more useful. Electronic circuitry pervades our modern lives in areas such as communication, entertainment, travel, productivity, and the like. One useful circuit is the differential signal transmitter.

Differential signaling offers several advantages over single-ended signaling. One is a significant reduction in Electro Magnetic Interference (EMI). Magnetic fields induced by one differential signal path tend to cancel out with magnetic fields induced by the other differential signal path. Differential signaling is also more resistant to negative effects of common mode noise. Differential signaling has been employed for some time.

More recently, Low Voltage Differential Signaling (LVDS) standards have been developed to employ differential signaling at higher throughputs and lower power than more traditional differential signaling technologies. Nevertheless, even conventional modern low voltage differential signaling has some drawbacks as will now be described with respect to FIG. 10.

FIG. 10 illustrates a conventional low voltage differential signaling output driver circuit 1000 in accordance with the prior art. Two voltage rails are provided, a high voltage rail 1001 and a low voltage rail 1002. As illustrated, the high voltage rail may be a voltage source at Vdd, which in low voltage applications may be, for example, 3.3 volts or 2.5 volts. The low voltage rail 1002 may be ground.

P-type Field Effect Transistor (PFET) 1013 and N-type Field Effect Transistor (NFET) 1017 serve as a current source and sink, respectively. The current source PFET 1013 is biased by voltage PB applied at bias terminal 1003, while the current sink NFET 1017 is biased by voltage NB applied at bias terminal 1004. The output differential voltage between output terminals 1008 (PADMN) and 1007 (PADMP) is a sum of two voltage drops: one across resistor 1009 and one across resistor 1010. By switching the voltage at switching terminals 1005 (RISE) and 1006 (FALL) in the opposite direction, current flowing through the two resistors 1009 and 1010 is likewise switched to the opposite direction. This changes the polarity of the differential voltage between output terminals 1007 and 1008.

For example, when the input voltage on switching terminal 1005 is high (and the input voltage on switching terminal 1006 is correspondingly low), PFET 1011 and NFET 1016 are on. This allows a current from the high voltage source 1001 to flow through current source PFET 1013, switching PFET 1011, resistors 1009 and 1010, switching NFET 1016, current sink NFET 1017 and into the low voltage source 1002. This current creates a positive differential across output nodes 1007 and 1008. Conversely, when the input voltage on switching terminal 1005 is low (and the input voltage on switching terminal 1006 is correspondingly high), PFET 1012 and NFET 1015 are on. This allows a current from the high voltage source 1001 to flow through current source PFET 1013, switching PFET 1012, resistors 1010 and 1009, switching NFET 1015, current sink NFET 1017 and into the low voltage source 1002. This current creates a negative differential across output nodes 1007 and 1008.

Due to Miller capacitive coupling between nodes 1005 and 1008 and between nodes 1006 and 1007, a significant overshoot and undershoot may be observed on node 1007 and 1008 when nodes 1005 and 1006 are switching. This overshoot and undershoot degrades signal integrity.

Specifically, the differential voltage between output terminals 1007 and 1008 ranges in magnitude from around 0.25V to around 0.45V according to the LVDS specification. Voltage swings on the input terminals 1005 and 1006 are from ground to Vdd and have a magnitude of the entire voltage supply (e.g., ground to 3.3V or ground to 2.5V depending on the supply voltage). Compared with a small differential across output terminals 1007 and 1008, the voltage swing on the input terminals 1005 and 1006 is significantly about one order of magnitude greater. Even a small Miller coupling ratio in the switching transistors would pass a significant amount of voltage from the input terminals 1005 and 1006 to the output terminals 1007 and 1008. Furthermore, in order to obtain the required throughput performance, the slew rates at input terminals 1005 and 1006 are not controlled and are normally designed to be as fast as possible. This further degrades signal integrity.

Also, the conventional LVDS driver does not have skew control between the two pre-driving signals asserted on the input terminals 1005 and 1006. Ideally there should be zero skew between those two voltages of opposite polarity. Uncontrolled skew between them would significantly distort the output voltage across the output terminals 1007 and 1008, particularly in varying the common mode voltage on common mode voltage terminal 1019.

Accordingly, what would be advantageous is an LVDS driver that has better signal integrity and controlled skew on its input terminals.

BRIEF SUMMARY OF THE INVENTION

The foregoing problems with the prior state of the art are overcome by the principles of the present invention, which relate to a differential signal output driver circuit that has a positive output terminal and a negative output terminal. A first switching field effect transistor is coupled between a first voltage source and one of the output terminals. A second switching transistor is coupled between the first voltage source and the other of the output terminals. Similarly, a third switching transistor is coupled between a second voltage source and the positive output terminal. A fourth switching transistor is coupled between the second voltage source and the negative output terminal. The positive and negative output terminals are coupled together via a resistor or a series of resistors.

The first voltage source may be Vdd with the second voltage source being Vss. In that case, the first and second switching transistors may be p-type, and the third and fourth switching transistors may be n-type. If the first voltage source is Vss and the second voltage source is Vdd, the first and second switching transistors may be n-type-and the third and fourth switching transistors may be p-type.

The gate terminals of the first and third switching transistors are coupled to one switching terminal, while the gate terminals of the second and fourth switching transistors are coupled to the other switching terminal. A bias transistor is coupled between at least one of the switching transistors and the corresponding output terminal. This shields the corresponding output terminal from Miller capacitance of the corresponding switching transistors. In one embodiment, each switching transistor has a corresponding shield bias transistor. With this shielding, the signal integrity is improved due to the lack of a capacitive coupling between the input signal and the output signal.

The differential signal output driver circuit may be driven on its switching terminals by driver circuitry having one or more stages. In one embodiment, this input stage circuitry is a skew cancellation circuit configured to generate a differential signal on the switching terminals of the differential signal output driver circuit that is largely skew balanced. This further improves signal integrity. The skew cancellation circuitry may improve signal integrity for any differential signal output driver, even those that do not conform with the principles of the present invention.

The skew cancellation circuitry includes a first signal source configured during operation to supply a first alternating signal, and a second signal source configured during operation to supply a second alternating signal. The second alternating signal is high when the first alternating signal is low, and vice versa.

A first differential converter circuit is coupled to the first signal source so as to receive the first alternating signal during operation, convert the first alternating signal into a differential signal, and assert a differential form of the first alternating signal on a positive output terminal and a negative output terminal of the first differential converter circuit. Similarly, a second differential converter circuit is coupled to the second signal source so as to receive the second alternative signal during operation, convert the second alternating signal into a differential signal, and assert a differential form of the second alternating signal also on a positive output terminal and a negative output terminal of the second differential converter circuit.

A first output terminal of the differential skew cancellation circuit is connected to both the positive output terminal of the first differential converter circuit and the negative output terminal of the second differential converter circuit. Similarly, a second output terminal of the differential skew cancellation circuit is connected to both the negative output terminal of the first differential converter circuit and the positive output terminal of the second differential converter circuit. The signal paths used for the first and second output terminals are similar in terms of the number of transitions. Accordingly, the differential signal applied at the first and second output terminals of the differential skew cancellation circuit is largely skew balanced. This differential signal may then be applied at the switching terminals of the differential signal output driver circuit to generate a signal with improved integrity.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A is a circuit diagram of a low voltage differential signal output driver circuit in accordance with another embodiment of the present invention in which bias transistors shield only P-type Field Effect Transistors (PFETs) from capacitively coupling to the output terminals;

FIG. 2B is a circuit diagram of a low voltage differential signal output driver circuit in accordance with yet another embodiment of the present invention in which bias transistors shield only N-type Field Effect Transistors (NFETs) from capacitively coupling to the output terminals;

DETAILED DESCRIPTION OF THE PREFERRED EMBODIMENTS

The principles of the present invention relate to a differential signal output driver circuit having four switching transistors. Bias transistors shield each of the switching transistors from the corresponding output terminal thereby blocking the Miller capacitance of the switching capacitor from generating overshoot or undershoot in the output differential voltage. Also, the output driver circuit may be driven by a differential skew cancellation circuit that generates a skew balanced differential signal to drive the switching transistors to further improve signal integrity. The signal path for generating each signal in the differential signal goes through a similar structure thereby ensuring similar propagation delay and thus small skew between the differential signals provided to the output driver circuit.

Figure 1:
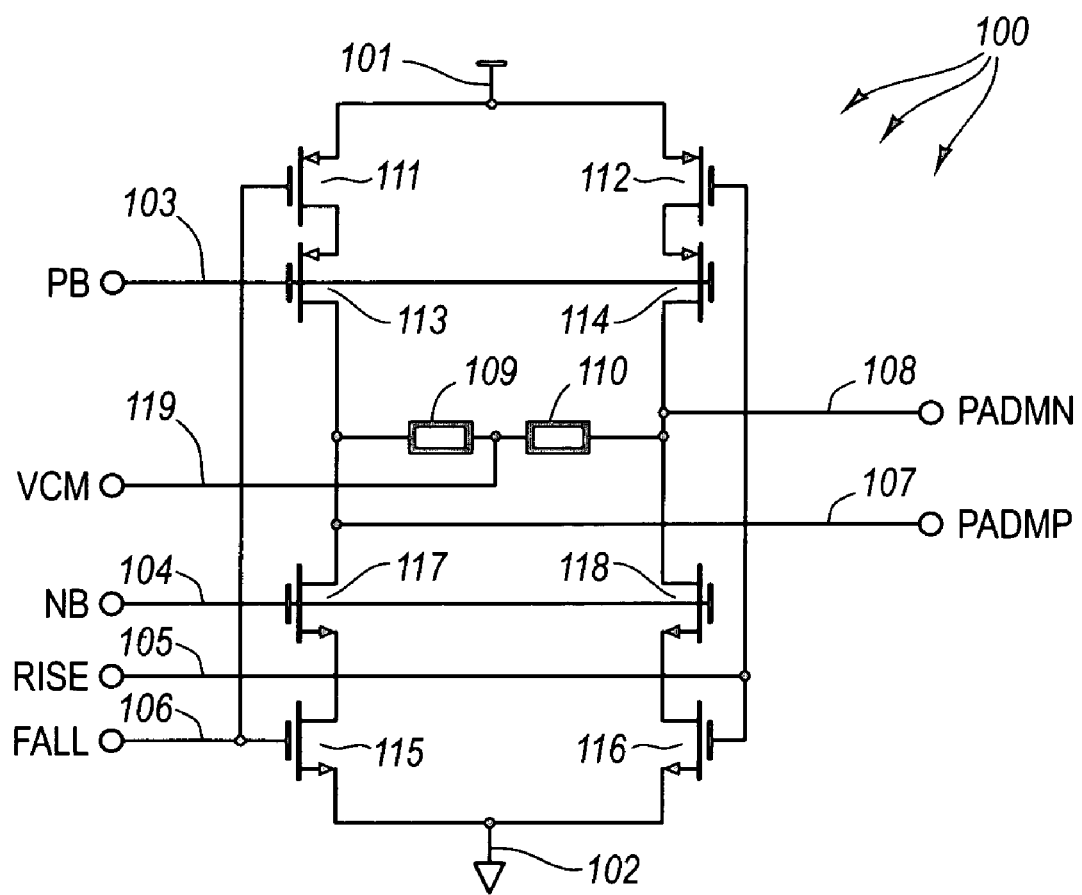
FIG. 1 is a circuit diagram of a low voltage differential signal output driver circuit in accordance with one embodiment of the present invention in which bias transistors shield all Field Effect Transistors (FETs) from capacitively coupling to the output terminals.

FIG. 1 is a circuit diagram of a low voltage differential signal output driver circuit 100 in accordance with one embodiment of the present invention in which bias transistors shield all Field Effect Transistors (FETs) from capacitively coupling to the output terminals. The differential signal output driver circuit includes a high voltage source 101 and a low voltage source 102. In Low Voltage Differential Signal (LVDS) applications, the high voltage source 101 may be, for example, 3.3 volts or 2.5 volts while the low voltage source 102 may be, for example, ground.

A first bias terminal 103 receives a bias voltage PB for use in controlling shield P-type Field Effect Transistors (PFETs) 113 and 114, while a second bias terminal 104 receives a bias voltage NB for use in controlling N-type Field Effect Transistors (NFETs) 117 and 118. Meanwhile, a first switching terminal 105 receives a differential input voltage RISE for use in driving switching PFET 112 and switching NFET 116. Similarly, a second switching terminal 106 receives a differential input voltage FALL for use in driving switching PFET 111 and switching NFET 115. The output driver circuit 100 also includes a differential output terminal including output terminal 107 (PADMP) and output terminal 108 (PADMN). PFETs and NFETs may also be referred to herein collectively as "transistors". Also, the term "terminals" in this description is used to describe particular nodes that interface with other circuitry by receiving input signals or providing output signals. The use of this term does not necessarily imply any interfacing with a printed circuit board. The LVDS output driver circuit 100 may be incorporated onto a single chip with all of its earlier stage driving circuitry.

Figure 10:
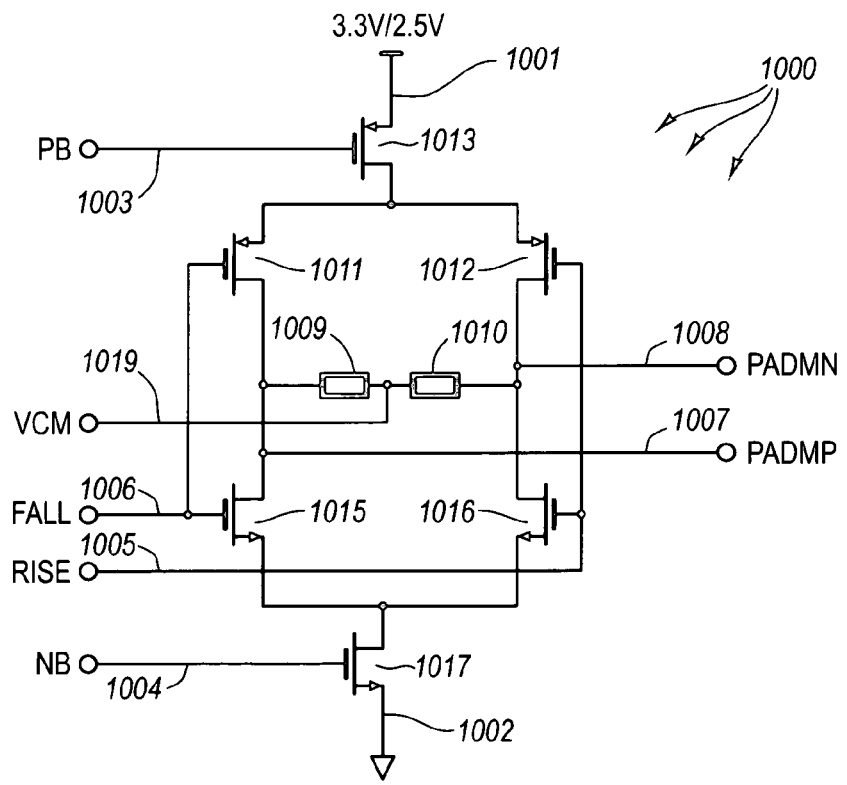
FIG. 10 is a circuit diagram of a low voltage differential signal output driver circuit in accordance with the prior art.

A resistor is coupled between the first output terminal 108 and the second output terminal 107. In the illustrated case, the resistor is a series of resistors 109 and 110 whose common node is a common mode voltage terminal 119. Unlike the conventional LVDS output driver circuit of FIG. 10, the bias voltage does not drive the current source or current sink, but instead causes transistors 113, 114, 117 and 118 to act as shields blocking Miller capacitive coupling from the input terminals to the output terminals through corresponding switching transistors 111, 112, 115 and 116. In this way, the overshoot/undershoot usually created by the Miller coupling between the outputs of the last driver stage and its immediate previous stage is significantly reduced if not eliminated. Accordingly, the LVDS output driver circuit 100 of FIG. 1 significantly improves signal integrity.

In order to provide antecedent basis for the claims, a further technical description of the structure of the LVDS output driver circuit 100 is now provided. The switching transistor 111 has a source terminal coupled to voltage source 101, a gate terminal coupled to the switching terminal 106, and a drain terminal. The switching transistor 112 has a source terminal coupled to the voltage source 101, a gate terminal coupled to the switching terminal 105, and a drain terminal. The bias transistor 113 has a source terminal coupled to the drain terminal of the switching transistor 111, a gate terminal coupled to the bias terminal 103, and a drain terminal coupled to the output terminal 107. The bias transistor 114 has a source terminal coupled to the drain terminal of the switching transistor 112, a gate terminal coupled to the bias terminal 103, and a drain terminal coupled to the output terminal 108.

The switching transistor 115 has a source terminal coupled to the voltage source 102, a gate terminal coupled to the switching terminal 106, and a drain terminal. The switching transistor 116 has a source terminal coupled to the voltage source 102, a gate terminal coupled to the switching terminal 105, and a drain terminal. The bias transistor 117 has a source terminal coupled to the drain terminal of the switching transistor 115, a gate terminal coupled to the bias terminal 104, and a drain terminal coupled to the drain terminal of the bias transistor 113. The bias transistor 118 has a source terminal coupled to the drain terminal of the switching transistor 116, a gate terminal coupled to the bias terminal 104, and a drain terminal coupled to the drain terminal of the bias transistor 114.

The bias voltages PB and NB are at sufficient levels to allow the bias transistors 113, 114, 117 and 118 to conduct a current such that its drain current (and the corresponding output voltage) is not sensitive to voltage fluctuations caused at its source terminal. Such fluctuations may be caused by, for example, Miller capacitive coupling from the input terminals through the corresponding switching transistor.

When the input voltage on switching terminal 105 is high (and the input voltage on switching terminal 106 is correspondingly low), PFET 111 and NFET 116 are on. This allows a current from the high voltage source 101 to flow through switching PFET 111, bias PFET 113, resistors 109 and 110, bias NFET 118, switching NFET 116, and into the low voltage source 102. This current creates a positive differential across output nodes 107 and 108. Conversely, when the input voltage on switching terminal 105 is low (and the input voltage on switching terminal 106 is correspondingly high), PFET 112 and NFET 115 are on. This allows a current from the high voltage source 101 to flow through switching PFET 112, bias PFET 114, resistors 110 and 109, bias NFET 117, switching NFET 115, and into the low voltage source 1002. This current creates a negative differential across output nodes 107 and 108.

The LVDS output driver circuit 100 of FIG. 1 provides comprehensive Miller capacitive blocking for each of the switching transistors. However, some protection may be provided even if only some of the switching transistors are shielded. For example, FIGS. 2A and 2B illustrated alternative hybrid embodiments in which only two of the four switching capacitors are shielded from the output terminal. While the embodiment of FIG. 1 is preferred over the embodiments of FIGS. 2A and 2B, the principles of the present invention illustrated in FIGS. 2A and 2B still provide some improvement in signal integrity over the conventional LVDS output driver circuit 1000 of FIG. 10.

FIG. 2A is a circuit diagram of an LVDS output driver circuit 200 in accordance with another embodiment of the present invention in which bias transistors shield only PFETs from Miller capacitive coupling to the output terminals. The various elements 201 through 217 and 219 are structured similar to the elements 101 through 117 and 119 described above with respect to FIG. 1, except for the following exceptions. Here, the drain terminal of the NFET switching transistor 215 is coupled directly to the drain terminal of the PFET bias transistor 213, and the drain terminal of the NFET switching transistor 216 is coupled directly to the drain terminal of the PFET bias transistor 214. Bias transistors 117 and 118 are absent. Instead, a single NFET bias transistor 217 has a drain terminal coupled to the source terminals of both the switching NFETs 215 and 216, and has a source terminal coupled directly to the low voltage source 202.

FIG. 2B is a circuit diagram of an LVDS output driver circuit 200' in accordance with another embodiment of the present invention in which bias transistors shield only NFETs from Miller capacitive coupling to the output terminals. The various elements 201' through 217' and 219' are structured similar to the elements 101 through 117 and 119 described above with respect to FIG. 1, except for the following exceptions. Here, the drain terminal of the switching PFET transistor 211' is coupled directly to the drain terminal of the NFET bias transistor 217', and the drain terminal of the PFET switching transistor 212' is coupled directly to the drain terminal of the PFET bias transistor 218'. Bias transistors 113 and 114 are absent. Instead, a single PFET bias transistor 213' has a drain terminal coupled to the source terminals of both the switching PFETs 211' and 212', and has a source terminal coupled directly to the high voltage source 201'.

Figure 3:
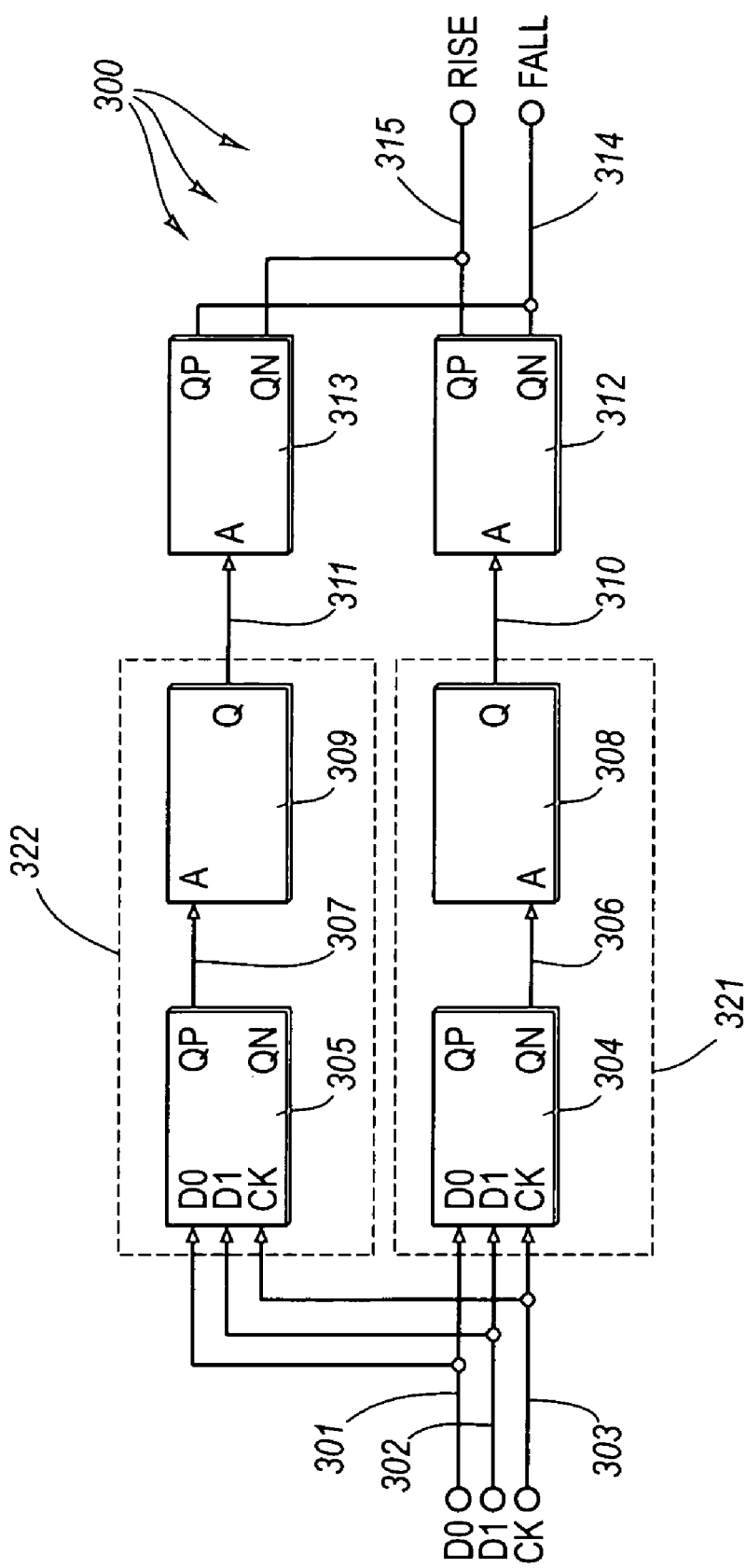
FIG. 3 schematically illustrates a differential skew cancellation circuit that may drive a low voltage differential signal output driver circuit in accordance with the principles of the present invention.

The differential input signals RISE and FALL may be generated by one or more input stage circuitry. An example of the input stage circuitry is illustrated in FIG. 3. The input stage circuitry of FIG. 3 is particularly advantageous as it is a differential skew cancellation circuit 300 that provides the differential signals with balanced skew between RISE and FALL. This further improves signal integrity by assuring a relatively stable common mode voltage on the common mode terminals (e.g., terminals 119, 219 and 219' of FIGS. 1, 2A and 2B). The differential skew cancellation circuit 300 may drive any of the LVDS output driver circuits 100, 200 or 200', but may also drive any circuit that uses differential inputs.

Referring to FIG. 3, the differential skew cancellation circuit 300 includes a two signal sources 321 and 322. Signal source 321 is configured during operation to supply a first alternating signal present on terminal 310. Likewise, signal source 322 is configured during operation to supply a second alternating signal present on terminal 311, the second alternating signal being high when the first alternating signal is low, and vice versa. The signal source 321 may include a Double Data Rate (DDR) circuit 304 and level shifter 308 configured as shown. Similarly, the signal source 322 may include DDR circuit 305 and level shifter 309 configured as shown.

Figure 4:
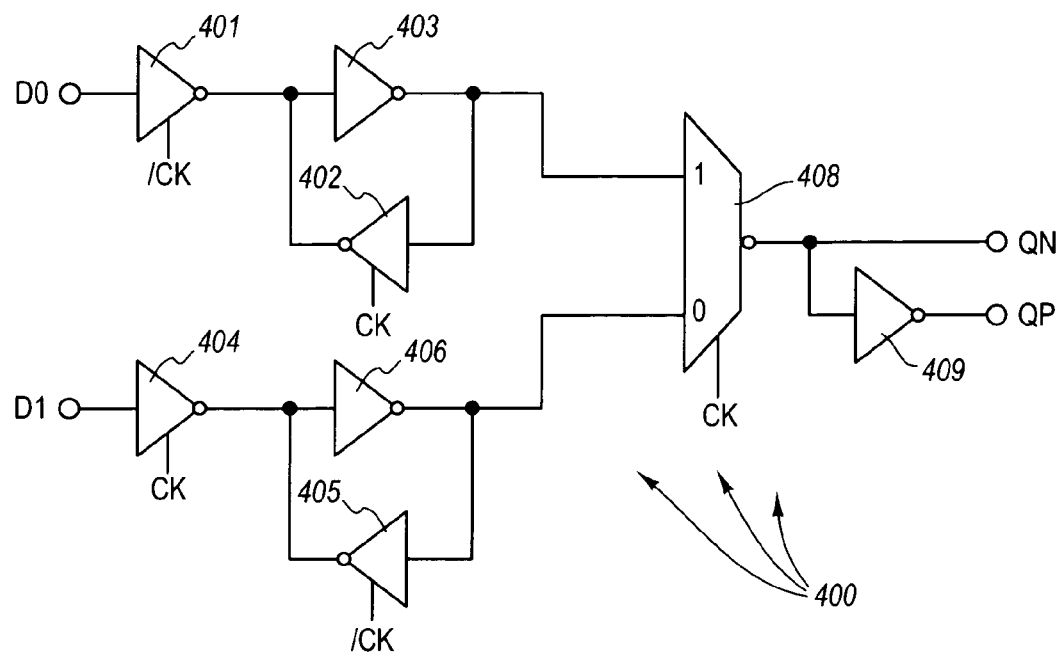
FIG. 4 is a circuit diagram of a double data rate circuit that may be suitable for the double data rate circuits of FIG. 3.
Figure 5:
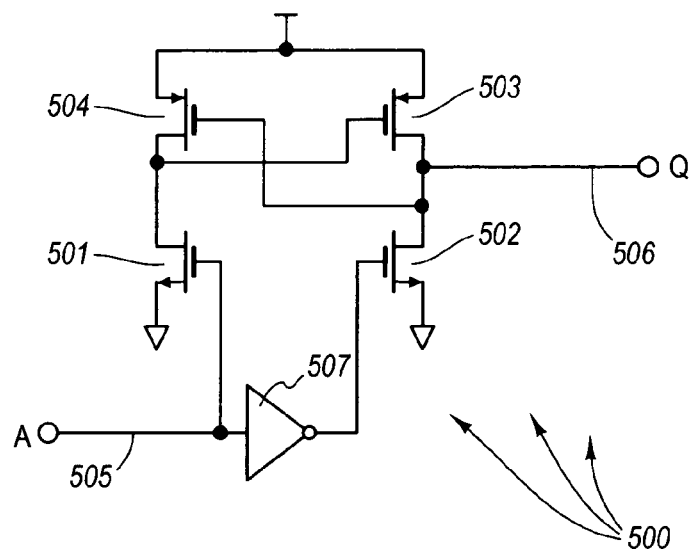
FIG. 5 is a circuit diagram of a level shifter circuit suitable for the level shifter circuits of FIG. 3.

DDR circuits 304 and 305 each receive differential data signals D0 and D1 on their common input terminals 301 and 302 as well as a common clock signal on clock terminal 303. The DDR circuits 304 and 305 then generate complementary signals 306 and 307 at core voltage levels (e.g., 1.8 volts or 1.5 volts). FIG. 4 illustrates a circuit diagram of an example of such a DDR circuit block and will be described further below. The core voltage signals 306 and 307 are each fed into a level shifter 308 and 309, where core voltages 1.8V or 1.5V are shifted to IO voltages at 3.3V or 2.5V, respectively. The level shifters may be identically structured. In that case, since the level shifters are each operating on signals 306 and 307 of opposite polarities, one level shifter will be exercising positive edge transitions while the other will be exercising the negative edge transitions. FIG. 5 shows a circuit diagram of an example level-shifter block, and will be described further below. The combination of the DDR and level-shifter in each differential signal path are one embodiment of a signal source configured to supply alternating signals.

Figure 6:
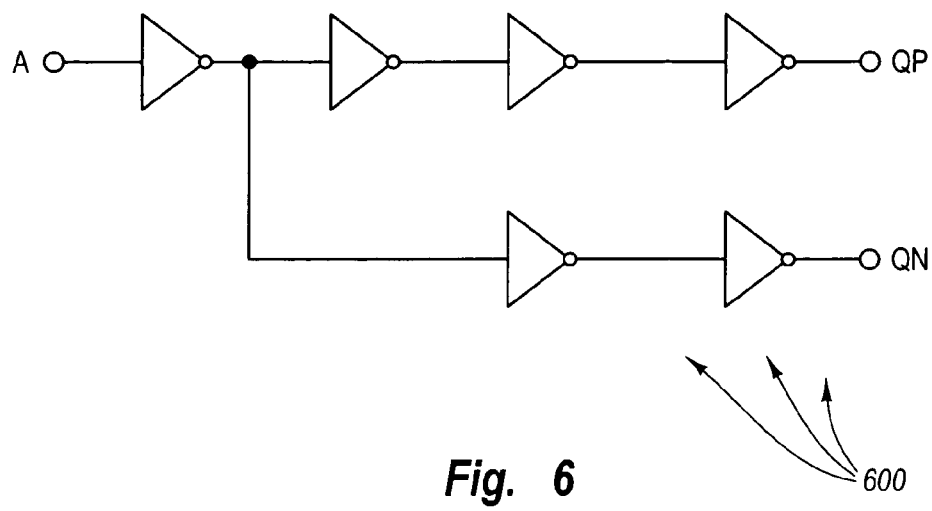
FIG. 6 is a circuit diagram of a differential converter circuit suitable for the differential converter circuits of FIG. 3.

The outputs 310 and 311 of the level shifters 308 and 309 are then fed into differential converter circuits 312 and 313 where the single-ended signals 310 and 311 are translated into differential signals and outputted at terminals QP and QN of the converters 312 and 313. A circuit diagram of an example differential converter circuit is illustrated in FIG. 6, which will be described further below. The resulting signals FALL 314 and RISE 315 may then be provided to the LVDS output driver circuit. Again, if the converters are identically structured, all switching nodes in one converter will be exercising positive or negative transitions while the corresponding nodes inside the other converter are exercising transition in opposite directions. As can be seen, QP output from top converter 313 is combined with QN output from bottom converter 312 to produce FALL signal on output terminal 314. Also QN output of top converter 313 is combined with QP output of bottom converter 312 to produce RISE signal on output terminal 315.

Comparing the two signal paths, one ending at output node RISE and the other ending at output node FALL, and noting both paths starting from input node 302 (CK) of DDR blocks 304 and 303, one can find that those two paths are exercising the same number of nodes doing positive and negative transition. Due to this structural symmetry, the skew between two nodes RISE and FALL is kept to minimum.

Referring to FIG. 3, the combination of the DDR 304 and the level shifter 308 represents an example of a first signal source configured during operation to supply a first alternating signal 310. Likewise, the combination of the DDR 305 and the level shifter 309 represents an example of a second signal source configured during operation to supply a second alternating signal, the second alternating signal being high when the first alternating signal is low, and vice versa.

Each DDR 304 and 305 may be structure as illustrated for the DDR 400 in FIG. 4. The DDR 400 is configured to receive data D0 on a first data input terminal, and other data D1 on a second data input terminal. The DDR 400 then generates differential forms of each of the data signals D0 and D1 at double the data rate of the data on each of the data input terminals. The differential form of the data signals are asserted on a positive output terminal QP and negative terminal QN of the DDR 400. The DDR 400 includes tri-state inverters 401, 402, 404 and 405; regular inverters 403, 406 and 409, and inverting multiplexer 408 configured as shown in FIG. 4.

Figure 7:
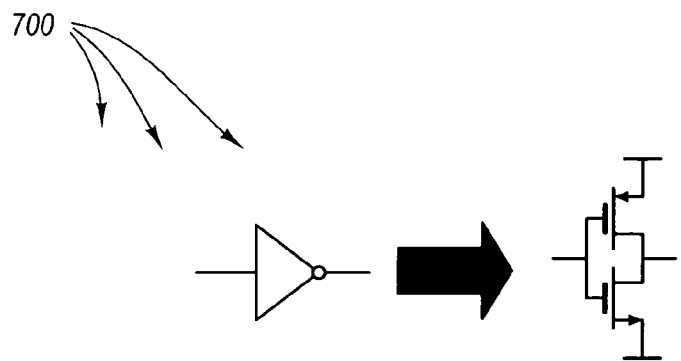
FIG. 7 is a circuit diagram of the inverter suitable for the inverters illustrated in FIGS. 4 through 6.
Figure 8:
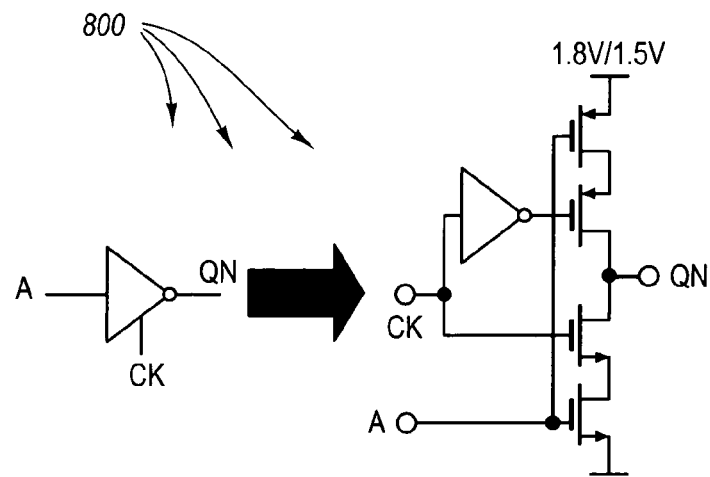
FIG. 8 is a circuit diagram of a tri-state inverter suitable for the tri-state inverters illustrated in FIG. 4.
Figure 9:
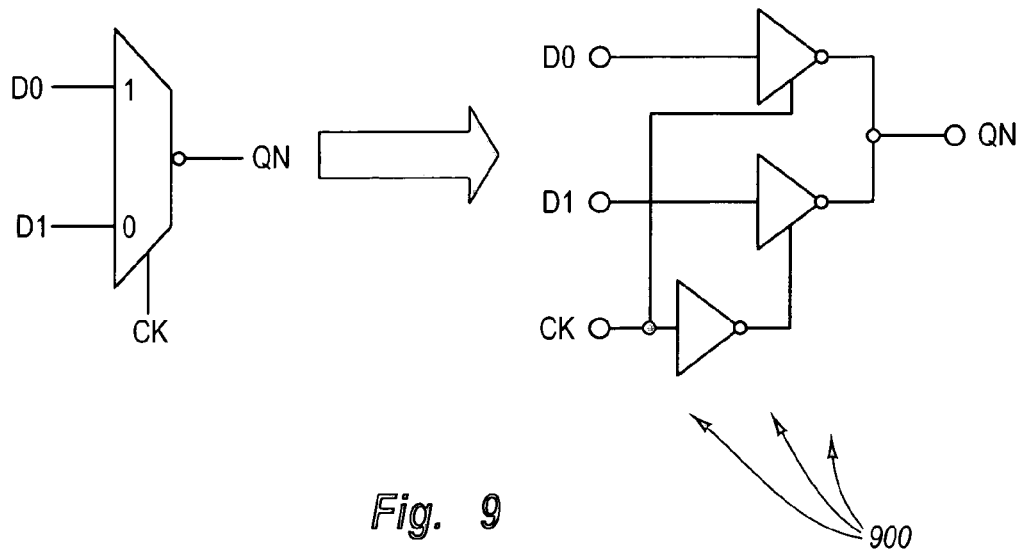
FIG. 9 is a circuit diagram of an inverting multiplexer suitable for the inverting multiplexer of FIG. 4.

FIG. 7 illustrates a circuit diagram for a regular inverter 700, which operates simply to invert the input signal, and apply the binary complement on its output terminal. FIG. 8 illustrates a circuit diagram for a tri-state inverter 800, which acts as a regular inverter when the clock input terminal has a high signal, and otherwise allows the output to float independent of the input terminal when the clock input terminal has a low signal. FIG. 9 illustrates a circuit diagram of an inverting multiplexer 900, which selects the upper input if the selection terminal has a high signal, and selects the lower input if the selection input has a low signal. In addition, the inverting multiplexer inverts whichever signal was selected and applies the inverted form of the selected input onto its output terminal.

FIG. 5 illustrates a circuit diagram of an example level shifter circuit 500. The level shifter circuit is configured to receive signal A at its input terminal 505 and provide a level shifter version Q of the signal at its output terminal 506 using FETs 501 through 504 and regular inverter 507 configured as shown. If the input signal A is ground, then the output signal Q is also ground. However, if the input signal A is at the core voltage level (e.g., 1.8 volts or 1.5 volts), then the output signal is at the high IO voltage level (e.g., 3.3 volts or 2.5 volts). Referring to FIG. 3, the first level shifter circuit 308 receives the differential signals QN produced by the DDR 304, while the second level shifter circuit 309 receives the other differential signal QP produced by the DDR 305. Since the DDR 304 and 305 receives the same input signals. Signals 310 and 311 are differential signals at the IO voltage levels.

FIG. 6 is a circuit diagram of a differential converter circuit 600 suitable for the differential converter circuits 312 and 313 of FIG. 3. Each differential circuit is configured to convert whichever alternating signal it receives into a differential form of that signal. The converter 600 includes six regular inverters. A first signal path between the input terminal A of the differential converter circuit 600 and the positive output terminal QP of the differential converter circuit 600 includes four inverters. A second signal path between the input terminal A and the positive output terminal QN includes three inverters. The first inverter in each signal path is common in both signal paths. In order to properly convert to a differential signal, if one signal path has an even number of inverters, the other signal path has an odd number of inverters, and vice versa.

In this configuration, the skew cancellation circuit generates signals RISE and FALL which are largely without skew. These signals may then be provided to LVDS output driver circuits such as the LVDS output driver circuit 100, 200 and 200' to allow for LVDS signals of high signal integrity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A differential signal output driver circuit comprising:
    a first voltage source;
    a second voltage source;
    a first bias terminal;
    a second bias terminal;
    a first switching terminal;
    a second switching terminal;
    a first output terminal;
    a second output terminal;
    a first switching field effect transistor having a source terminal coupled to the first voltage source, a gate terminal coupled to the second switching terminal, and a drain terminal;
    a second switching field effect transistor having a source terminal coupled to the first voltage source, a gate terminal coupled to the first switching terminal, and a drain terminal;
    a first bias field effect transistor having a source terminal coupled to the drain terminal of the first switching field effect transistor, a gate terminal coupled to the first bias terminal, and a drain terminal coupled to the first output terminal;
    a second bias field effect transistor having a source terminal coupled to the drain terminal of the second switching field effect transistor, a gate terminal coupled to the first bias terminal, and a drain terminal coupled to the second output terminal;
    a resistor coupled between the first output terminal and the second output terminal;
    a third switching field effect transistor having a source terminal coupled at least indirectly to the second voltage source, a gate terminal coupled to the second switching terminal, and a drain terminal coupled at least indirectly to the drain terminal of the first bias field effect transistor; and
    a fourth switching field effect transistor having a source terminal coupled at least indirectly to the second voltage source, a gate terminal coupled to the first switching terminal, and a drain terminal coupled at least indirectly to the drain terminal of the second bias field effect transistor.

2. A differential signal output driver circuit in accordance with claim 1,
    wherein the first voltage source is configured during operation to supply a higher voltage than the second voltage source,
    wherein the first switching field effect transistor, the second switching field effect transistor, the first bias field effect transistor, and the second bias field effect transistor are p-type field effect transistors; and
    wherein the third switching field effect transistor and the fourth switching field effect transistor are n-type field effect transistors.

3. A differential signal output driver circuit in accordance with claim 1,
    wherein the first voltage source is configured during operation to supply a lower voltage than the second voltage source,
    wherein the first switching field effect transistor, the second switching field effect transistor, the first bias field effect transistor, and the second bias field effect transistor are n-type field effect transistors; and
    wherein the third switching field effect transistor and the fourth switching field effect transistor are p-type field effect transistors.

4. A differential signal output driver circuit in accordance with claim 1, further comprising the following:
    a third bias field effect transistor having a source terminal coupled to the second voltage source, a gate terminal coupled to the second bias terminal, and a drain terminal coupled to the source terminal of the third switching field effect transistor and to the source terminal of the fourth switching field effect transistor.

5. A differential signal output driver circuit in accordance with claim 4,
    wherein the first voltage source is configured during operation to supply a higher voltage than the second voltage source,
    wherein the first switching field effect transistor, the second switching field effect transistor, the first bias field effect transistor, and the second bias field effect transistor are p-type field effect transistors; and
    wherein the third switching field effect transistor, the fourth switching field effect transistor, and the third bias field effect transistor are n-type field effect transistors.

6. A differential signal output driver circuit in accordance with claim 4,
    wherein the first voltage source is configured during operation to supply a lower voltage than the second voltage source,
    wherein the first switching field effect transistor, the second switching field effect transistor, the first bias field effect transistor, and the second bias field effect transistor are n-type field effect transistors; and
    wherein the third switching field effect transistor, the fourth switching field effect transistor, and the third bias field effect transistor are p-type field effect transistors.

7. A differential signal output driver circuit in accordance with claim 1, further comprising:
    a third bias field effect transistor having a source terminal coupled to the drain terminal of the third switching field effect transistor, a gate terminal coupled to the second bias terminal, and a drain terminal coupled to the drain terminal of the first bias field effect transistor; and
    a fourth bias field effect transistor having a source terminal coupled to the drain terminal of the fourth switching field effect transistor, a gate terminal coupled to the second bias terminal, and a drain terminal coupled to the drain terminal of the second bias field effect transistor.

8. A differential signal output driver circuit in accordance with claim 1, wherein the resistor is a series resistor comprising a first resistor and a second resistor, further comprising:
a common mode voltage terminal coupled between the first and second resistors.

9. A differential signal output driver circuit in accordance with claim 1, wherein the first voltage source is approximately 3.3 volts and the second voltage source is approximately ground.

10. A differential signal output driver circuit in accordance with claim 1, wherein the first voltage source is approximately 2.5 volts and the second voltage source is approximately ground.

11. A differential signal output driver circuit in accordance with claim 1, wherein the first voltage source is approximately ground and the second voltage source is approximately 3.3 volts.

12. A differential signal output driver circuit in accordance with claim 1, wherein the first voltage source is approximately ground and the second voltage source is approximately 2.5 volts.

13. A differential signal output driver circuit in accordance with claim 1, further comprising the following:
one or more input stage circuitry configured during operation to generate a differential signal on the first and second switching terminals.

* * * * *

UNITED STATES PATENT AND TRADEMARK OFFICE
CERTIFICATE OF CORRECTION

PATENT NO. : 7,034,574 B1 Page 1 of 1
APPLICATION NO. : 10/920009
DATED : April 25, 2006
INVENTOR(S) : Li It is certified that error appears in the above-identified patent and that said Letters Patent is hereby corrected as shown below:

Column 6
Line 24, change "1002" to --102--
Line 30, change "illustrated" to --illustrate--

Column 7
Line 32, after "common clock signal" insert --CK--

Column 8
Line 4, change "303" to --305--

Column 9
Line 2, change "positive" to --negative--

Signed and Sealed this

Fifth Day of December, 2006

JON W. DUDAS
*Director of the United States Patent and Trademark Office*